United States Patent [19]

Carlsen et al.

[11] Patent Number: 4,504,121

[45] Date of Patent: Mar. 12, 1985

[54] INTERFEROMETRIC MULTIMODE FIBER OPTIC SWITCH AND MODULATOR

[75] Inventors: W. John Carlsen, Boston; Paul Melman, Newton, both of Mass.

[73] Assignee: GTE Laboratories Incorporated, Waltham, Mass.

[21] Appl. No.: 317,362

[22] Filed: Nov. 2, 1981

[51] Int. Cl.³ .............................................. G02F 1/03
[52] U.S. Cl. ................................. 350/385; 350/377; 350/389
[58] Field of Search ............... 350/385, 355, 354, 353, 350/356–358, 389, 392, 393, 381, 388, 96.14, 96.19, 96.2, 377

[56] References Cited

U.S. PATENT DOCUMENTS 3,614,198  10/1971  Martin et al. .................. 350/96.19
4,278,327   6/1981  McMahan et al. ............. 350/96.14

FOREIGN PATENT DOCUMENTS 0033551  3/1977  Japan ............................... 350/385

Primary Examiner—Bruce Y. Arnold
Attorney, Agent, or Firm—Fred Fisher

[57] ABSTRACT

Interferometric multimode fiber optic switches and modulators include combinations of various components. Two electro-optical crystals have a dielectric beam splitting coating affixed to portions thereof. The coated portions of the two crystals are juxtaposed. Means are provided for varying indices of refraction of the two crystals with respect to each other. Light entering into the first crystal and traveling within the two crystals can be switched to selectively exit from one crystal or from the other by varying the index of refraction of one of the crystals with respect to that of the other. By interferometric principle of operation, the phase relation of light is transformed into spatial direction. The crystals can be selected from the group consisting of lithium niobate, lithium tantalate, and barium strontium niobate. The dielectric beam splitting coating can be formed of multiple layers of material such as zirconium oxide and silicon dioxide. The indices of refraction of the crystals are varied by applying electric fields of one polarity at opposite surfaces thereof. Light enters the various crystals, and is reflected, and is transmitted at various surfaces thereof so that, upon entering a particular area within the crystals, reinforcement or interference of light can occur.

21 Claims, 5 Drawing Figures

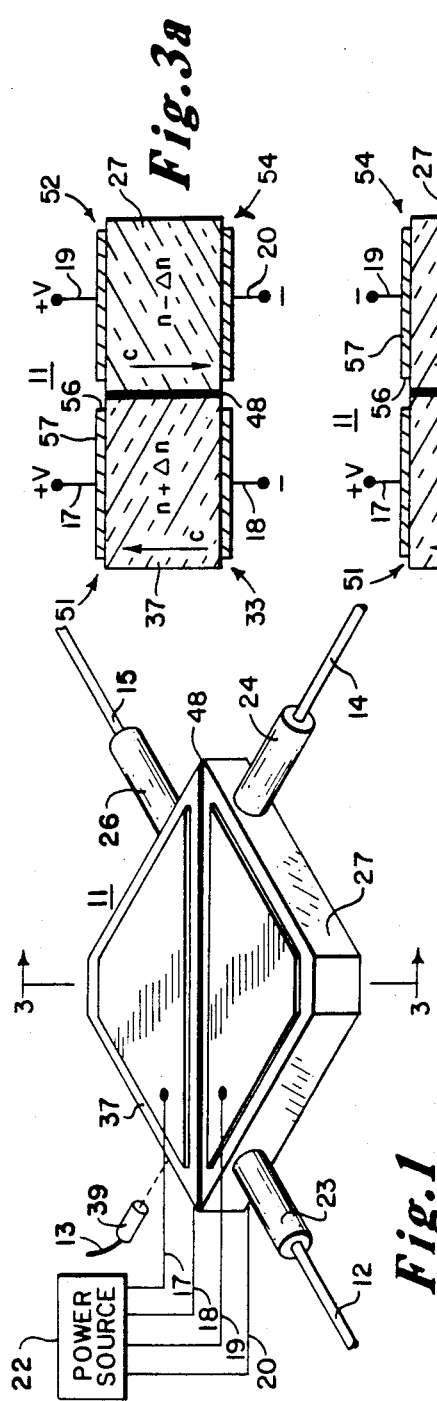
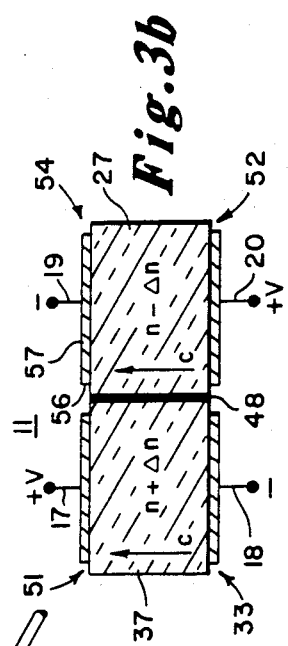
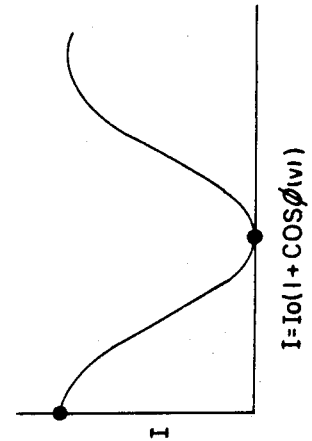
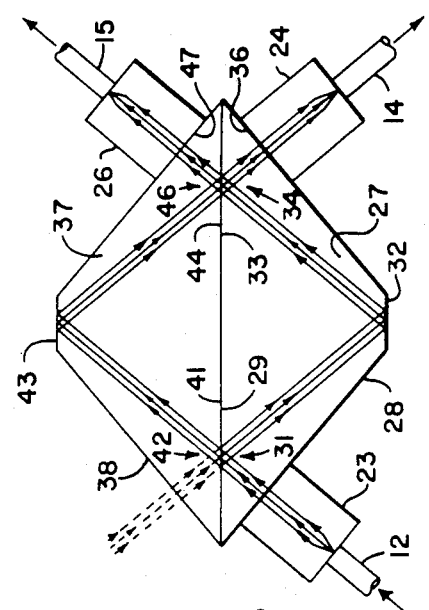

INTERFEROMETRIC MULTIMODE FIBER OPTIC SWITCH AND MODULATOR

BACKGROUND OF THE INVENTION

1. Field of the Invention

This invention relates to interferometric multimode fiber optic switches and modulators and, in particular, relates to electro-optical, multimode fiber optical switching or modulating devices, depending upon their modes of operation. Accordingly, it is a general object of this invention to provide new and improved devices of such character.

2. Description of the Prior Art

Switching and modulating devices of the prior art operate in various manners. Commonly, such functions are performed electronically and the final results are converted into optical information. All-optical switching apparatus are available in two general types: one type is a mechanical switch in which an input fiber is physically displaced between two stable configurations corresponding to alignment with one of two output fibers. Such motion is realized by either an electromagnetic activator or a piezoelectric transducer. A second type utilizes a thicklayer, multimode planar wave guide in an electro-optical substrate. Application of voltage to such substrate creates a discontinuity in index of refraction and, therefore, a change in the direction of propagation of the light beam, usually using total internal reflection for such purpose.

Modulation can be achieved in the prior art electronically by varying the current through the light source, per se, such as an LED (light emitting diode) or a laser diode.

Disadvantageously, electronic schemes of the prior art of switching and modulating introduce power conversion losses, additional noise, and nonlinearities into the characteristics of available light sources.

Disadvantageously, mechanical schemes of the prior art include numerous deficiencies, such as their inherent sluggishness due to inertia of moving parts. They usually require relatively high power and voltage due to their large and cumbersome sizes. They are subject to wear of moving parts, and, therefore, their reliability is not satisfactory.

Disadvantageously, the multimode planar wave guide techniques require mode conversion from the fiber cylindrical structure to the planar geometry, such conversion introducing significant losses. Furthermore, the many modes excited in the planar wave guide differ in propagation constants, and, therefore, the degree to which the electro-optical effect affects them varies according to mode parameter. For such reason, the "extinction ratio" (i.e., the ratio of the maximum amount of light out from the modulator to the minimum amount of light out from the modulator) is not very high, and reported results have not exceeded 20 dB.

SUMMARY OF THE INVENTION

A device in accordance with the invention can operate in the switching mode in which an optical signal from a multimode fiber is directed into one of the two output fibers, depending on the magnitude of applied voltage. The device can operate in the modulation mode in which the light intensity in either or both output fibers is modulated depending on the applied voltage.

When a device in accordance with this invention is utilized in a multimode optical fiber communications system, sufficient speed and extinction ratio is achieved to provide GHz modulation of a continuous wave light source, high-speed space-domain switching of optical signals, and time-division multiplexing.

Accordingly, it is another object of this invention to provide a new and improved all-optical device which can be switched and modulated.

Yet another object of this invention is to provide a new and improved optical switch.

Still yet another object of this invention is to provide a new and improved optical modulator.

Another object of this invention is to provide a new and improved fiber optic switch which can be controlled by the application, or non-application, of an applied electrical field.

Still yet another object of this invention is to provide a new and improved optical modulator which can be controlled by the application, or non-application, of an electrical field.

In accordance with one embodiment of this invention, a combination is provided including a dielectric beam splitting coating affixed to portions of two electro-optical crystals with coated portions of the crystals being juxtaposed. Suitable means vary the index of refraction of one of the crystals with respect to that of the other. In accordance with certain features of the invention, light entering into the first crystal and traveling within the first crystal and the second crystal can be switched to exit from one of the two crystals by varying the index of refraction of one of the crystals with respect to that of the other. Light polarized in one direction entering into the first crystal and traveling within the first crystal and the second crystal can be switched to exit from one crystal to the other, coincidentally with light polarized in the same direction entering into the second crystal and traveling within the second crystal and the first crystal being switched to exit from the other crystal to the one crystal, by varying the index of refraction of one of the crystals with respect to that of the other. The light entering into the first crystal and traveling within the first crystal and the second crystal can be modulated to exit from one of the crystals in accordance with the variance of an index of refraction of one crystal with respect to that of the other. By the invention's interferometric principle of operation, the phase relation of light can be transformed into spatial direction. One, or each, of the crystals can be selected from a group of crystals consisting of lithium niobate, lithium tantalate, and barium strontium niobate. The dielectric beam splitting coating can be formed of a single layer of a thickness which produces fifty percent transmission of light by frustrated total internal reflection. The beam splitting coating can be formed of multiple layers of material. One layer can be zirconium oxide; another layer can be silicon dioxide. The means for varying an index of refraction of one of the crystals with respect to that of the other can include means for applying an electrical field to each of the crystals. The crystals can be oriented adjacent to each other with their crystallographic axes oriented in the same direction; suitable means apply an electric field of a given polarity across the first crystal in line with its crystallographic axis, and suitable means apply an electric field of the opposite polarity across the second crystal in line with its crystallographic axis. Alternatively, the two crystals can be oriented adjacent to each other with their crystallographic axes oriented antiparallel to each other; suitable means apply an electrical field of a given polarity across the crystals in line with their crystallographic axes. The means for varying an index of refraction of one of the crystals with respect to that of the other can comprise electrodes deposited upon opposite portions of the crystals. Each electrode can be formed of a chromium layer affixed to a respective crystal, and a layer of gold affixed to the chromium layer. The chromium layer can be evaporated upon a respective crystal with a gold layer evaporated upon the chromium layer.

In accordance with another embodiment of the invention, a combination can include a pair of electro-optical crystals. Each crystal has a respective first surface adapted to receive a beam of collimated and polarized light from a first and second external source, respectively, for transmission through the respective crystal. Each crystal further contains a respective second surface adapted to receive such transmitted light from its respective first surface at a first spot. The respective crystals each have a respective first reflective surface oriented to receive light from the first spot of the second surface of the respective crystal and to reflect such received light. Each crystal further contains a respective third surface adapted to receive such reflected light from its respective first reflective surface upon a respective second spot. Each crystal further contains a respective fourth surface adapted to externally pass light impinged thereupon from its respective second spot. The combination further includes a dielectric beam splitting coating. The two crystals and the coating are so oriented that the first spots of the second surfaces of the two crystals are substantially juxtaposed with a first portion of the coating oriented therebetween, and the second spots of the third surfaces of the two crystals are substantially juxtaposed with a second portion of the coating oriented therebetween. The combination is further provided with means for varying an index of refraction of one of the crystals with respect to that of the other. The beams of collimated light from the two external sources are polarized in the same direction.

In accordance with certain features of the foregoing invention, collimated and polarized light from the first external source can pass through the first surface of the first crystal to its second surface at its first spot. Thus, due to the dielectric beam splitting coating, a first portion of the light impinging upon the first crystal first spot is reflected to the first reflective surface of the first crystal and, in turn, is reflected to the third surface of the first crystal at its second spot, and a second portion of the light impinging upon the first crystal first spot is transmitted through the first portion of the coating through the first spot of the second crystal to the reflective surface thereof and in turn is reflected to the third surface of the second crystal at the second spot thereof. Collimated and polarized light from the second external source passes through the first surface of the second crystal to the second surface thereof at the first spot thereof, whereupon, due to the dielectric beam splitting coating, a first portion of the light impinging upon the second crystal first spot from its first surface is reflected to the first reflective surface thereof and, in turn, is reflected to the third surface thereof at the second spot thereof, and a second portion of light impinging upon the second crystal first spot from its first surface is transmitted through the first portion of the coating through the first spot of the first crystal to the reflective surface of the first crystal and in turn is reflected to the third surface of the first crystal at the second spot of the first crystal. When the indices of refraction of both crystals remain unchanged, collimated and polarized light from the first external source at the second spots of the crystals both (a) reinforce and externally pass out through the fourth surface of the second crystal, and (b) interfere and fail to externally pass out through the fourth surface of the first crystal. Collimated and polarized light from the second external source at the second spots of the crystals both (a) reinforce and externally pass out through the fourth surface of the first crystal, and (b) interfere and fail to externally pass out through the fourth surface of the second crystal. When the indices of refraction of both the crystals are changed so that light passes through one crystal at a specific rate of speed different from the rate of speed of light through the remaining crystal, the collimated and polarized light from the first external source at the second spots of the crystals both (a) reinforce and externally pass out through the fourth surface of the first crystal, and (b) interfere and fail to externally pass out through the fourth surface of the second crystal. Collimated and polarized light from the second external source at the second spots of the crystals both (a) reinforce and externally pass out through the fourth surface of the second crystal, and (b) interfere and fail to externally pass out through the fourth surface of the first crystal.

In still yet another embodiment of the invention, a combination includes a pair of electro-optical crystals. Each crystal has a first surface, respectively, adapted to receive a first beam of collimated and polarized light from a first or a second external source, respectively, for transmission therethrough. Each crystal contains a second surface, respectively, adapted to receive such transmitted light from its respective first surface at a respective first spot. Each crystal contains a first reflective surface, respectively, oriented to receive light from the first spot of its respective second surface and to reflect such received light. Each crystal further contains a third surface, respectively, adapted to receive such reflected light from its respective first reflective surface upon a second spot, respectively. Each crystal further contains a fourth surface, respectively. The fourth surface of the first crystal is adapted to externally pass light impinged thereupon from its respective second spot. The combination further includes a dielectric beam splitting coating. The two crystals and the coating are so oriented that the first spots of the second surfaces of the two crystals are substantially juxtaposed with a first portion of the coating oriented therebetween. The second spots of the third surfaces of the two crystals are substantially juxtaposed with a second portion of the coating oriented therebetween. Means are provided for varying the index of refraction of one of the crystals with respect to that of the other. The beams of collimated light from the two external sources are polarized in the same direction.

In accordance with certain features of the foregoing embodiment, collimated and polarized light from the first and second external sources, respectively, can pass through the first surface of a respective crystal to the second surface thereof at its respective first spot, whereupon, due to the dielectric beam splitting coating, a first portion of the light impinging upon a respective crystal, at its respective first spot, is reflected to its respective first reflective surface, and, in turn, is reflected to the third surface of the respective crystal at its respective second spot; and a second portion of the light impinging upon the respective first spots of the first and second crystals, respectively, is transmitted through the first portion of the coating through the first spots of the second and first crystals, respectively, to the reflective surfaces of the second crystal and first crystal, respectively, and, in turn, is reflected to the third surface of the second crystal and first crystal, respectively, at the second spot of the second crystal and first crystal, respectively. When the indices of refraction of both crystals remain unchanged, collimated and polarized light from the first external source at the second spots of the crystals interfere and fail to externally pass out through the fourth surface of the first crystal, and collimated and polarized light from the second external source at the second spots of the crystals reinforce and externally pass out through the fourth surface of the first crystal. When the indices of refraction of both crystals are changed so that light passes through one crystal at a specific rate of speed different from that through the remaining crystal, collimated and polarized light from the first external source at the second spots of the crystals reinforce and externally pass out through the fourth surface of the first crystal, and collimated and polarized light from the second external source at the second spots of the crystals interfere and fail to externally pass out through the fourth surface of the first crystal.

In accordance with still yet another embodiment of the invention, a combination includes a pair of electro-optical crystals. The first electro-optical crystal has a first surface adapted to receive a beam of collimated and polarized light from an external source for transmission through the first crystal. The first crystal has a second surface adapted to receive such transmitted light from the first surface at a first spot. The first crystal further has a first reflective surface oriented to receive light from the first spot of its second surface and to reflect such received light. The first crystal has a third surface adapted to receive such reflected light from its first reflective surface upon a second spot, and the first crystal further has a fourth surface adapted to externally pass light impinged thereupon from its second spot. The second electro-optical crystal has a first surface and further has a second surface which is oriented to receive transmitted light from the second surface of the first crystal at a first spot. The second crystal has a first reflective surface oriented to receive light from the first spot of its second surface and to reflect such received light. The second crystal has a third surface which is adapted to receive such reflected light from its first reflective surface upon a second spot, the second crystal having a fourth surface adapted to externally pass light impinged thereupon from its second spot. A beam splitting coating and the two crystals are so oriented that the first spots of the second surfaces of the two crystals are substantially jutxaposed with a first portion of the coating oriented therebetween. The second spots of the third surfaces of the two crystals are substantially juxtaposed with a second portion of the coating oriented therebetween. Means are provided for varying the index of refraction of one of the crystals with respect to the index of refraction of the other of the crystals.

In accordance with certain features of the foregoing embodiment, collimated and polarized light from the external source can pass through the first surface of the first crystal to its second surface at its first spot, whereupon, due to the dielectric beam splitting coating, a first portion of the light impinging upon the first crystal first spot is reflected to its first reflective surface and, in turn, is reflected to its third surface at its second spot; and a second portion of the light impinging upon the first crystal first spot is transmitted through the first portion of the coating through the first spot of the second crystal to the reflective surface of the second crystal and, in turn, is reflected to the third surface of the second crystal at the second spot of the second crystal. When the indices of refraction of both crystals remain unchanged, collimated and polarized light from the external source at the second spots of the two crystals both (a) reinforce and externally pass out through the fourth surface of the second crystal; and (b) interfere and fail to externally pass out through the fourth surface of the first crystal. When the indices of refraction of both crystals are changed so that light passes through one crystal at a specific rate of speed different from that through the remaining crystal, collimated and polarized light from the external source at the second spots of the crystals both (a) reinforce and externally pass out through the fourth surface of the first crystal, and (b) interfere and fail to externally pass out through the fourth surface of the second crystal.

BRIEF DESCRIPTION OF THE DRAWINGS

Other objects, advantages and features of this invention, together with its construction and mode of operation, will become more apparent from the following description, when read in conjunction with the accompanying drawing, in which:

FIG. 1 is a perspective view of one embodiment of this invention;

FIG. 2 is a diagrammatic top view illustrating certain optical features of the invention;

FIGS. 3A and 3B are cross-sectional views taken along the line 3—3 of FIG. 1, which views illustrate various embodiments of the invention; and FIG. 4 is a waveform illustrating certain principles of the invention.

DESCRIPTION OF PREFERRED EMBODIMENTS

Referring to FIG. 1, there is depicted an external perspective view of an interferometric multimode fiber optic switch and modulator 11 (hereinafter referred to as "device"), together with associated input fibers 12, 13 and output fibers 14, 15. The device 11 is coupled via suitable leads 17, 18, 19, 20 to a power source 22. FIG. 2 schematically illustrates paths of light rays through a cross-section of the device 11 shown in FIG. 1. Specifically, in FIG. 2, no cross-sectional hatching is shown for clarity.

The device 11, as shown in FIGS. 1 and 2, includes optics 23 for collimating light applied from the input fiber 12. Optionally, separate collimating optics can be used for collimating a light from the input fiber 13. The light from the input fiber 13 can be applied as a laser beam directly onto the device 11, as depicted in FIG. 2, without the use of separate collimating optics. The device 11 further includes a first focusing optic member 24 for focusing an output from the device 11 onto the output optical fiber 14. Similarly, a separate focusing optic member 26 is used for focusing another output from the device 11 onto the output fiber 15.

Collimating optics 23 and focusing optic members 24, 26 can be produced by various means well known in the art. An effective means is set forth in U.S. Pat. No. 4,421,383, a continuation of copending U.S. patent application Ser. No. 112,991, filed Jan. 17, 1980 (now abandoned), entitled "Optical Fiber Connectors", by W. John Carlsen, assigned to the common assignee of this invention, and incorporated herein by reference. As used therein, telecentric optical fiber connectors 13, 33 function as a collimating optics and as a focusing optic member, respectively.

Referring particularly to FIG. 2, a polarized output beam from the input fiber 12, collimated via the collimating optics 23, enters an electro-optical crystal 27. The aperture of the crystal 27 is sufficiently large that the propagating beam consists, essentially, of free space modes (i.e., waveguiding and diffraction effects are negligible) and, therefore, the beam remains collimated to within a small angular cone. Thus, the differences in propagation constants for the beam rays are very small. Light from the optical fiber 12, after passing through the collimated optics 23, enters a first surface 28 of the crystal 27, the first surface 28 being adapted to receive the beam of collimated and polarized light from the optical fiber 12 for transmission through the first crystal 27. A second surface 29 of the crystal 27 is adapted to receive the transmitted light from the first surface 28 of the crystal 27 at a first spot 31. A first reflective surface 32 on the crystal 27 is oriented to receive light from the first spot 31 of the second surface 29 of the first crystal 27 and to reflect such received light. The crystal 27 contains a third surface 33 adapted to receive reflected light from the first reflective surface 32 of the first crystal 27 upon a second spot 34. A fourth surface 36 of the crystal 27 is oriented to externally pass light impinged thereupon from the second spot 34 of the first crystal 27.

In similar fashion, a second electro-optical crystal 37 has a first surface 38 adapted to receive a second beam of collimated and polarized light from a second external source 39 for transmission therethrough. A second surface 41 on the crystal 37 is adapted to receive such transmitted light from the first surface 38 thereof at a first spot 42. A first reflective surface 43 on the crystal 37 is oriented to receive light from its first spot 42 and to reflect such received light. The second electro-optical crystal 37 has a third surface 44 which is adapted to receive the reflected light from its first reflection surface 43 upon a second spot 46. The second crystal 37 further contains a fourth surface 47 which is oriented to externally pass light impinged therethrough from its second spot 46.

The device 11 further contains a dielectric beam splitting coating 48. The first crystal 27, the second crystal 37, and the dielectric beam splitting coating 48 are so oriented that the first spot 31 on the second surface 29 of the first crystal 27, and the first spot 42 on the second surface 41 of the first crystal 37 are substantially juxtaposed with a first portion of the coating 48 oriented between. The second spot 34 of the third surface 33 of the first crystal 27 and the second spot 46 of the third surface 44 of the second crystal 37 are substantially juxtaposed with a second portion of the coating 48 oriented therebetween. The second surface 29 and the third surface 33 of the first crystal 27 (at the respective first and second spots 31 and 34) engage, respectively, with the second surface 41 and the third surface 44 of the crystal 37 at the first and second spots 42, and 46, respectively. As depicted in FIG. 2 the second surfaces 29, 41 and the third surfaces 33, 44 can be co-planar; however it is obvious to those of ordinarily skill in the art that such surfaces can be non-contiguous.

After a beam of light enters the device 11, it splits into two equal intensity parts due to the dielectric (lossless) beam splitting coating 48. The two parts propagate separately within the crystals 27 and 37 and, after reflection from the reflecting surfaces 43 and 32, recombine on another part of the beam splitter 48. Since the geometry is such that phase relations between the two beam parts are preserved, the reflected and transmitted components of each beam in the recombination region at the second spots 34 and 46 interfere with each other. Therefore, the intensity of the two output beams are determined by relative phase between the two separated beam parts before they are recombined. A 0° phase shift results in all of the intensity propagating in one direction (such as downward, as viewed in FIG. 2), while 180° phase shift results in all of the intensity propagating in the upward direction along the output fiber 15. The crystallographic axes of the crystals 27, 37 are oriented such that application of a voltage in a preferred direction results in phase retardation between the two beams and, therefore, in different intensity ratios of the output beams along the output fibers 14, 15. In a switching mode, a voltage corresponding to 180° phase shift is applied. In a modulation mode, the voltage is proportional to the signal magnitude and, thus, is translated to beam intensity variations. The two output beams are coupled through focusing optics 24, 26, respectively, into two output fibers 14, 15.

The polarization of a light beam applied to a crystal is linear in a direction such as to only retard the phase of the light, and not to rotate the direction of polarization. As examples, the polarization of light is parallel to the C-axis for both lithium niobate and lithium tantalate crystals.

An optical switch, in accordance with this invention, can have two input ports instead of one. The switch can have one input port, via the optical fiber 12 and the collimating optics 23; in lieu thereof, it can have two input ports, namely, along the optical fiber 12 and the collimating optics 23, and from the external source 39. With two input ports, switching voltages can be applied to switch light signals from the input fibers 12, 13 to the output fibers 14, 15, respectively, or to the output fibers 15, 14, respectively, depending upon the applied voltages. Alternatively, when utilizing both inputs and only one output, an electrical selection can be performed for determining which of the two inputs 12, 13 exit from the one output fiber 14.

As viewed in FIG. 3A, the crystallographic axes C—C of the two crystals 27, 37 are oriented in opposite directions to each other. With the two crystals 27, 37 oriented with the crystallographic axes anti-parallel to each other, as shown, voltage can be applied across top electrodes 51, 52 and bottom electrodes 53, 54 via the lines 17, 18 and 19, 20, respectively, with the voltage applied to the top electrodes 51, 52 being positive with respect to electrodes 53, 54. Alternatively, as depicted in FIG. 3B, with the crystallographic axes of the two crystals 27, 37 oriented in the same direction, voltages are applied across their respective electrodes in opposite polarity relationship.

By applying a voltage such that the upper electrodes 51, 52 are positive with respect to the bottom electrodes 53, 54, crystal 37 has an orientation C which is directed upward, and crystal 27 has an orientation C which is directed downward. Hence, the index of refraction for the crystal 37 goes from n to n+$\Delta$n, and, similarly, the index of refraction for the crystal 27 goes from n to n−Δn. With a difference of indices of refraction between the two crystals 27, 37, the speed of light therethrough travels at different rates.

As viewed in FIG. 1, the top of the device 11 has a hexagonal configuration. The top wires 17, 19 and the bottom wires 18, 20 can be respectively tied to similar polarities, as depicted in FIG. 3A. Alternatively, as depicted in FIG. 3B, the same effect can be achieved by orienting the two crystals 27, 37 with their optical axes C—C aligned in the same direction, and voltages of opposite polarities applied thereacross.

A 50% beam splitting layer 48 can be initially achieved by applying a multilayer dielectric coating along the second surface 29 and the third surface 33 of the crystal 27 or along the second surface 41 and the third surface 44 of the crystal 37. The dielectric coating, preferably, is several stacked layers of material, as, for example, zirconium oxide and silicon dioxide. Other coatings can be applied.

Electrodes 51, 52, 53, 54, at opposite sides of the crystals 27, 37 are applied by evaporating layers 56—56 of chromium onto the respective crystals 27, 37 followed by layers 57—57 of gold. The application of the chromium layers 56—56 to the crystals 27, 37 and the application of the superimposed gold layers 57—57 to the chromium layers 56—56 yield effective adhesion of both layers 56, 57 onto the crystal substrates 27, 37 with low resistance and good uniformity.

In a modulating mode, normally only one output fiber (such as fiber 14) is used. When the voltages applies across the electrodes are in phase, the light output on that one output fiber is at a maximum; and when the voltages across the electrodes are a half of a wave out of phase, the light output on that fiber 14 is minimal or negligible. As the light through the two crystals 27, 37 travel at different rates, the two beams of light emit out of phase, resulting in intensity modulation of the output light. When the two beams are 45° out of phase, some light is emitted. Thus, when the beams are in phase, the light is at a maximum. When the beams are out of phase, it is at a minimum, and somewhere in between, the light output is sinusoidally varied. This is illustrated by the formula $I = I_0(1 + \cos \phi(v))$, where $\phi$ is the phase difference between the two beams of light, v is the function of the voltage. When I goes from 0 to 30 volts, I goes from in phase to 180° out of phase. When I goes from 30 to 60 volts, I goes back into phase again, rather than being saturated. The intensity of the light output is proportional to the square of the applied electrical field.

When operated in the switching mode, apparatus in accordance with this invention can achieve very high extinction ratios, somewhere in the neighborhood of 40 decibels. The apparatus can operate at very high speeds, in excess of a 1 GHz rate. The voltage required depends upon the particular crystal used; for most common crystals as lithium niobate, only 30 volts is necesssary. This figure is reduced when the sizes of the crystals are made larger. The power consumption is very small, and depends upon frequency. The insertion losses are expected to be low due to the collimating optics, the high index of refraction of this type of crystal, and because there is no limit on mode excitation in free space.

In the modulation mode, since the light beam is modulated (in lieu of the light source which is driven at a constant level), the problems of directly modulating the source's drive current (such as shorter life time and nonlinearity of the light (sources) do not arise. The device provides two complementary modulated output beams which can be used for communication over two channels, or one of the outputs can be used for monitoring purposes.

The collimating optics 23 can be constructed of conventional lenses or graded index rods of ¼ pitch length or otherwise as described in U.S. Pat. No. 4,421,383, a continuation of the copending application Ser. No. 112,991 (now abandoned). The beam splitter 48 can be either a multilayer coating or a single layer of a thickness which produces 50% transmission by frustrated total internal reflection. Frustrated total internal reflections yield slightly higher extinction ratios. Electro-optical crystals 27, 37 can be any of the various large variety of crystals, such as lithium niobate, lithium tantalate, barium strontium niobate, etc., in a mode which produces phase shift only, without rotation of the polarization vector.

It will be apparent to those of ordinarily skill in the art that various modifications can be performed without departing from the spirit and scope of this invention. It is desired, therefore, that this invention be limited solely by the scope of the appended claims.

What is claimed is:

1. In combination:
   first electro-optical crystal means,
   second electro-optical crystal means,
   a dielectric beam splitting coating affixed to portions of both of said crystal means with coated portions of both of said crystal means being juxtaposed, and
   means for varying an index of refraction of one of said crystal means with respect to an index of refraction of the other of said crystal means.

2. The combination as recited in claim 1 wherein said means for varying an index of refraction of one of said crystal means with respect to an index of refraction of the other of said crystal means causes light entering into said first crystal means and traveling within said first crystal means and said second crystal means to be switched to exit from said first crystal means or said second crystal means.

3. The combination as recited in claim 1 wherein said means for varying an index of refraction of one of said crystal means with respect to an index of refraction of the other of said crystal means causes light polarized in one direction entering into said first crystal means and traveling within said first crystal means and said second crystal means to be switched to exit from said first crystal means or from said second crystal means, coincidentally with light polarized in the same direction entering into said second crystal means and traveling within said second crystal means and said first crystal means being switched to exit from said second crystal means or from said first crystal means, respectively.

4. The combination as recited in claim 1 wherein the means for varying an index of refraction of one of said crystal means with respect to an index of refraction of the other of said crystal means causes light entering into said first crystal means and traveling within said first crystal means and said second crystal means to be modulated and to exit from one of said crystal means.

5. The combination as recited in claim 1 wherein one of said crystals is selected from a group of crystal means consisting lithium niobate, lithium tantalate, and barium strontium niobate.

6. The combination as recited in claim 1 wherein said crystals are selected from a group of crystal means consisting lithium niobate, lithium tantalate, and barium strontium niobate.

7. The combination as recited in claim 1 wherein said dielectric beam splitting coating is formed of a single layer of a thickness which produces fifty percent transmission of light by frustrated total internal reflection.

8. The combination as recited in claim 1 wherein said dielectric beam splitting coating is formed of multiple layers of material.

9. The combination as recited in claim 8 wherein one of said layers is zirconium oxide, and another of said layers is silicon dioxide.

10. The combination as recited in claim 1 wherein said means for varying an index of refraction of one of said crystal means with respect to an index of refraction of the other of said crystal means includes means for applying an electrical field to each of said crystal means.

11. The combination as recited in claim 10 wherein said first crystal means and said second crystal means are oriented adjacent to each other with their crystallographic axes oriented in the same direction, and further comprising means for applying an electric field of a given polarity across said first crystal means in line with its crystallographic axis, and means for applying an electric field of the opposite polarity across said second crystal means in line with its crystallographic axis.

12. The combination as recited in claim 10 wherein said first crystal means and said second crystal means are oriented adjacent to each other with their crystallographic axes oriented antiparallel to each other, and further comprising means for applying an electric field of a given polarity across both said crystal means in line with their crystallographic axes.

13. The combination as recited in claim 1 wherein said means for varying the index of refraction of one of said crystal means with respect to the index of refraction of the other of said crystal means comprises electrodes deposited upon opposite portions of said crystals.

14. The combination as recited in claim 13 wherein each of said electrodes is formed of a layer of chromium adhered to a respective crystal means, and a layer of gold affixed to said chromium layer.

15. The combination as recited in claim 14 wherein said chromium layer is an evaporated layer upon said respective crystal, and said gold layer is an evaporated layer upon said chromium layer.

16. In combination:
a first electro-optical crystal having
a first surface adapted to receive a first beam of collimated and polarized light from a first external source for transmission through said first crystal,
a second surface adapted to receive such transmitted light from said first surface of said first crystal at a first spot,
a first reflective surface oriented to receive light from said first spot of said second surface of said first crystal and to reflect such received light,
a third surface adapted to receive such reflected light from said first reflective surface of said first crystal upon a second spot, and
a fourth surface adapted to externally pass light impinged thereupon from said second spot of said first crystal;
a second electro-optical crystal having
a first surface adapted to receive a second beam of collimated and polarized light from a second external source for transmission through said second crystal,
a second surface adapted to receive such transmitted light from said first surface of said second crystal at a first spot,
a first reflective surface oriented to receive light from said first spot of said second surface of said second crystal and to reflect such received light,
a third surface adapted to receive such reflected light from said first reflective surface of said second crystal upon a second spot, and
a fourth surface adapted to externally pass light impinged thereupon from said second spot of said second crystal;
a dielectric beam splitting coating,
said first crystal, said second crystal, and said coating being so oriented that
said first spot of said second surface of said first crystal, and said first spot of said second surface of said second crystal are substantially juxtaposed with a first portion of said coating oriented therebetween, and
said second spot of said third surface of said first crystal, and said second spot of said third surface of said second crystal are substantially juxtaposed with a second portion of said coating oriented therebetween; and
means for varying an index of refraction of one of said crystals with respect to an index of refraction of the other of said crystals; and wherein
said beams of collimated light from said first external source and said second external source are polarized in the same direction.

17. In combination:
a first electro-optical crystal having
a first surface adapted to receive a first beam of collimated and polarized light from a first external source for transmission through said first crystal,
a second surface adapted to receive such transmitted light from said first surface of said first crystal at a first spot,
a first reflective surface oriented to receive light from said first spot of said second surface of said first crystal and to reflect such received light,
a third surface adapted to receive such reflected light from said first reflective surface of said first crystal upon a second spot, and
a fourth surface adapted to externally pass light impinged thereupon from said second spot of said first crystal;
a second electro-optical crystal having
a first surface adapted to receive a second beam of collimated and polarized light from a second external source for transmission through said second crystal,
a second surface adapted to receive such transmitted light from said first surface of said second crystal at a first spot,
a first reflective surface oriented to receive light from said first spot of said second surface of said second crystal and to reflect such received light,
a third surface adapted to receive such reflected light from said first reflective surface of said second crystal upon a second spot, and
a fourth surface adapted to externally pass light impinged thereupon from said second spot of said second crystal;
a dielectric beam splitting coating,
said first crystal, said second crystal, and said coating being so oriented that
- said first spot of said second surface of said first crystal, and said first spot of said second surface of said second crystal are substantially juxtaposed with a first portion of said coating oriented therebetween, and
- said second spot of said third surface of said first crystal, and said second spot of said third surface of said second crystal are substantially juxtaposed with a second portion of said coating oriented therebetween; and means for varying an index of refraction of one of said crystals with respect to an index of refraction of the other of said crystals; and wherein
- said beams of collimated light from said first external source and said second external source are polarized in the same direction, whereby,
- collimated and polarized light from said first external source can pass through said first surface of said first crystal to said second surface of said first crystal at said first spot of said first crystal, whereupon, due to said dielectric beam splitting coating, a first portion of said light impinging upon said first crystal first spot is reflected to said first reflective surface of said first crystal and in turn is reflected to said third surface of said first crystal at said second spot of said first crystal and a second portion of said light impinging upon said first crystal first spot is transmitted through said first portion of said coating through said first spot of said second crystal to said reflective surface of said second crystal and in turn is reflected to said third surface of said second crystal at said second spot of said second crystal; and collimated and polarized light from said second external source can pass through said first surface of said second crystal to said second surface of said second crystal at said first spot of said second crystal, whereupon, due to said dielectric beam splitting coating, a first portion of said light impinging upon said second crystal first spot from said second crystal first surface is reflected to said first reflective surface of said second crystal and in turn is reflected to said third surface of said second crystal at said second spot of said second crystal and a second portion of said light impinging upon said second crystal first spot from said second crystal first surface is transmitted through said first portion of said coating through said first spot of said first crystal to said reflective surface of said first crystal and in turn is reflected to said third surface of said first crystal at said second spot of said first crystal, and, when said indices of refraction of both of said crystals remain unchanged, collimated and polarized light from said first external source at said second spots of said crystals both (a) reinforce and externally pass out through said fourth surface of said second crystal, and (b) interfere and fail to externally pass out through said fourth surface of said first crystal, and collimated and polarized light from said second external source at said second spots of said crystals both (a) reinforce and externally pass out through said fourth surface of said first crystal, and (b) interfere and fail to externally pass out through said fourth surface of said second crystal, and when said indices of refraction of both said crystals are changed so that light passes through one crystal at a specific rate of speed different from the rate of speed of light through the remaining crystal, collimated and polarized light from said first external source at said second spots of said crystals both (a) reinforce and externally pass out through said fourth surface of said first crystal, and (b) interfere and fail to externally pass out through said fourth surface of said second crystal, and collimated and polarized light from said second external source at said second spots of said crystals both (a) reinforce and externally pass out through said fourth surface of said second crystal, and (b) interfere and fail to externally pass out through said fourth surface of said first crystal.

18. In combination:
a first electro-optical crystal having
- a first surface adapted to receive a first beam of collimated and polarized light from a first external source for transmission through said first crystal,
- a second surface adapted to receive such transmitted light from said first surface of said first crystal at a first spot,
- a first reflective surface oriented to receive light from said first spot of said second surface of said first crystal and to reflect such received light,
- a third surface adapted to receive such reflected light from said first reflective surface of said first crystal upon a second spot, and
- a fourth surface adapted to externally pass light impinged thereupon from said second spot of said first crystal;

a second electro-optical crystal having
- a first surface adapted to receive a second beam of collimated and polarized light from a second external source for transmission through said second crystal,
- a second surface adapted to receive such transmitted light from said first surface of said second crystal at a first spot,
- a first reflective surface oriented to receive light from said first spot of said second surface of said second crystal and to reflect such received light,
- a third surface adapted to receive such reflected light from said first reflective surface of said second crystal upon a second spot, and
- a fourth surface;

a dielectric beam splitting coating,
said first crystal, said second crystal, and
said coating being so oriented that
- said first spot of said second surface of said first crystal, and said first spot of said second surface of said second crystal are substantially juxtaposed with a first portion of said coating oriented therebetween, and
- said second spot of said third surface of said first crystal, and said second spot of said third surface of said second crystal are substantially juxtaposed with a second portion of said coating oriented therebetween; and means for varying an index of refraction of one of said crystals with respect to an index of refraction of the other of said crystals; and wherein
said beams of collimated light from said first external source and said second external source are polarized in the same direction.

19. In combination:
a first electro-optical crystal having
- a first surface adapted to receive a first beam of collimated and polarized light from a first external source for transmission through said first crystal,
- a second surface adapted to receive such transmitted light from said first surface of said first crystal at a first spot,
- a first reflective surface oriented to receive light from said first spot of said second surface of said first crystal and to reflect such received light,
- a third surface adapted to receive such reflected light from said first reflective surface of said first crystal upon a second spot, and
- a fourth surface adapted to externally pass light impinged thereupon from said second spot of said first crystal;

a second electro-optical crystal having
- a first surface adapted to receive a second beam of collimated and polarized light from a second external source for transmission through said second crystal,
- a second surface adapted to receive such transmitted light from said first surface of said second crystal at a first spot,
- a first reflective surface oriented to receive light from said first spot of said second surface of said second crystal and to reflect such received light,
- a third surface adapted to receive such reflected light from said first reflective surface of said second crystal upon a second spot, and
- a fourth surface;

a dielectric beam splitting coating,
said first crystal, said second crystal, and said coating being so oriented that
- said first spot of said second surface of said first crystal, and said first spot of said second surface of said second crystal are substantially juxtaposed with a first portion of said coating oriented therebetween, and
- said second spot of said third surface of said first crystal, and said second spot of said third surface of said second crystal are substantially juxtaposed with a second portion of said coating oriented therebetween; and means for varying an index of refraction of one of said crystals with respect to an index of refraction of the other of said crystals; and wherein said beams of collimated light from said first external source and said second external source are polarized in the same direction, whereby, collimated and polarized light from said first external source can pass through said first surface of said first crystal to said second surface of said first crystal at said first spot of said first crystal, whereupon, due to said dielectric beam splitting coating, a first portion of said light impinging upon said first crystal first spot is reflected to said first reflective surface of said first crystal and in turn is reflected to said third surface of said first crystal at said second spot of said first crystal and a second portion of said light impinging upon said first crystal first spot is transmitted through said first portion of said coating through said first spot of said second crystal to said reflective surface of said second crystal and in turn is reflected to said third surface of said second crystal at said second spot of said second crystal;
and collimated and polarized light from said second external source can pass through said first surface of said second crystal to said second surface of said second crystal at said first spot of said second crystal, whereupon, due to said dielectric beam splitting coating, a first portion of said light impinging upon said second crystal first spot from said second crystal first surface is reflected to said first reflective surface of said second crystal and in turn is reflected to said third surface of said second crystal at said second spot of said second crystal and a second portion of said light impining upon said second crystal first spot from said second crystal first surface is transmitted through said first portion of said coating through said first spot of said first crystal to said reflective surface of said first crystal and in turn is reflected to said third surface of said first crystal at said second spot of said first crystal, and when said indices of refraction of both of said crystals remain unchanged collimated and polarized light from said first external source at said second spots of said crystals interfere and fail to externally pass out through said fourth surface of said first crystal, and collimated and polarized light from said second external source at said second spots of said crystals reinforce and externally pass out through said fourth surface of said first crystal, and when, the indices of refraction of both said crystals are changed so that light passes through one crystal at a specific rate of speed different from the rate of speed of light through the remaining crystal, collimated and polarized light from said first external source at said second spots of said crystals reinforce and externally pass out through said fourth surface of said first crystal, and collimated and polarized light from said second external source at said second spots of said crystals interfere and fail to externally pass out through said fourth surface of said first crystal.

20. In combination:
a first electro-optical crystal having
- a first surface adapted to receive a beam of collimated and polarized light from an external source for transmission through said first crystal,
- a second surface adapted to receive such transmitted light from said first surface of said first crystal at a first spot,
- a first reflective surface oriented to receive light from said first spot of said second surface of said first crystal and to reflect such received light,
- a third surface adapted to receive such reflected light from said first reflective surface of said first crystal upon a second spot, and
- a fourth surface adapted to externally pass light impinged thereupon from said second spot of said first crystal;

a second electro-optical crystal having
- a first surface,
- a second surface oriented to receive transmitted light from said second surface of said first crystal at a first spot,
- a first reflective surface oriented to receive light from said first spot of said second surface of said second crystal and to reflect such received light, a third surface adapted to receive such reflected light from said first reflective surface of said second crystal upon a second spot, and
  a fourth surface adapted to externally pass light impinged thereupon from said second spot of said second crystal;
a dielectric beam splitting coating; and wherein said first crystal, said second crystal, and said coating are so oriented that
  said first spot of said second surface of said first crystal, and said first spot of said second surface of said second crystal are substantially juxtaposed with a first portion of said coating oriented therebetween, and
  said second spot of said third surface of said first crystal, and said second spot of said third surface of said second crystal are substantially juxtaposed with a second portion of said coating oriented therebetween; and
means for varying an index of refraction of one of said crystals with respect to an index of refraction of the other of said crystals.

21. In combination:
a first electro-optical crystal having
  a first surface adapted to receive a beam of collimated and polarized light from an external source for transmission through said first crystal,
  a second surface adapted to receive such transmitted light from said first surface of said first crystal at a first spot,
  a first reflective surface oriented to receive light from said first spot of said second surface of said first crystal and to reflect such received light,
  a third surface adapted to receive such reflected light from said first reflective surface of said first crystal upon a second spot, and
  a fourth surface adapted to externally pass light impinged thereupon from said second spot of said first crystal;
a second electro-optical crystal having
  a first surface,
  a second surface oriented to receive transmitted light from sid second surface of said first crystal at a first spot,
  a first reflective surface oriented to receive light from said first spot of said second surface of said second crystal and to reflect such received light,
  a third surface adapted to receive such reflected light from said first reflective surface of said second crystal upon a second spot, and
  a fourth surface adapted to externally pass light impinged thereupon from said second spot of said second crystal;
a dielectric beam splitting coating,
  said first crystal, said second crystal, and said coating being so oriented that
  said first spot of said second surface of said first crystal, and said first spot of said second surface of said second crystal are substantially juxtaposed with a first portion of said coating oriented therebetween, and
  said second spot of said third surface of said first crystal, and said second spot of said third surface of said second crystal are substantially juxtaposed with a second portion of said coating oriented therebetween; and
means for varying an index of refraction of one of said crystals with respect to an index of refraction of the other of said crystals, whereby,
  collimated and polarized light from said external source can pass through said first surface of said first crystal to said second surface of said first crystal at said first spot of said first crystal, whereupon, due to said dielectric beam splitting coating, a first portion of said light impinging upon said first crystal first spot is reflected to said first reflective surface of said first crystal and in turn is reflected to said third surface of said first crystal at said second spot of said first crystal and a second portion of said light impinging upon said first crystal first spot is transmitted through said first portion of said coating through said first spot of said second crystal to said reflective surface of said second crystal and in turn is reflected to said third surface of said second crystal at said second spot of said second crystal; and
  when said indices of refraction of both of said crystals remain unchanged, collimated and polarized light from said external source at said second spots of said crystals both (a) reinforce and externally pass out through said fourth surface of said second crystal, and (b) interfere and fail to externally pass out through said fourth surface of said first crystal, and
when said indices of refraction of both said crystals are changed so that light passes through one crystal at a specific rate of speed different from the rate of speed of light through the remaining crystal, collimated and polarized light from said external source at said second spots of said crystals both (a) reinforce and externally pass out through said fourth surface of said first crystal, and (b) interfere and fail to externally pass out through said fourth surface of said second crystal.

* * * * *